United States Patent [19]
Keaten

[11] Patent Number: 5,713,019
[45] Date of Patent: Jan. 27, 1998

[54] ICONIC ACCESS TO REMOTE ELECTRONIC MONOCHROME RASTER DATA FORMAT DOCUMENT REPOSITORY

[76] Inventor: Timothy M. Keaten, 3048 E. Clairton Dr., Highlands Ranch, Colo. 80126

[21] Appl. No.: 548,901

[22] Filed: Oct. 26, 1995

[51] Int. Cl.$^6$ ............................................ G06F 17/30
[52] U.S. Cl. ......................... 395/610; 395/612; 395/615
[58] Field of Search ........................... 395/610, 612, 395/615

[56] References Cited

U.S. PATENT DOCUMENTS

| | | | |
|---|---|---|---|
| 5,457,772 | 10/1995 | Shannon | 395/109 |
| 5,509,115 | 4/1996 | Butterfield et al. | 395/118 |
| 5,521,722 | 5/1996 | Colvill et al. | 395/500 |
| 5,615,314 | 3/1997 | Schoenzeit et al. | 395/118 |
| 5,655,062 | 8/1997 | Tompkins et al. | 395/109 |

OTHER PUBLICATIONS

Zhang et al, A Video Database System for Digital Libraries, Digital Libraries, Current Issues, Digital Workshop, 19–20 May 1994, pp. 253–264.

*Primary Examiner*—Wayne Amsbury
*Attorney, Agent, or Firm*—Thomas W. Hanson

[57] ABSTRACT

A method and apparatus for storage and retrieval of electronic documents is disclosed. A central document repository and one or more remote access sites are interconnected via a general purpose data network. Documents are stored within the system using a monochrome, raster format. Documents are transmitted from the repository to the remote access sites for display to the user. Additional capability is provided to search the stored documents; generate on-demand user interface screens containing the search results; insert documents into the repository via transmission by facsimile machine; and to interactively communicate between users of the system. The electronic documents can be either conventional text and graphics; or multi-media documents containing text, video, and audio material. A single physical document repository can be logically segmented into multiple virtual repositories supporting diverse groups of users.

11 Claims, 5 Drawing Sheets

ICONIC ACCESS TO REMOTE ELECTRONIC MONOCHROME RASTER DATA FORMAT DOCUMENT REPOSITORY

FIELD OF THE INVENTION

This invention relates to storage and retrieval of electronic documents and more specifically, to such systems which provide user access via computer networks.

BACKGROUND INFORMATION

The disclosed invention combines technologies from two diverse areas of the computer systems development arts: storage and retrieval systems for digitized documents; and Wide Area Network (WAN) development. It supplements these arts with facsimile transmission (FAX) technology.

The use of computer systems to store documents as image files and to provide search and retrieval capabilities for these documents is known. The majority of these systems are either stand-alone, single computer systems, or they are implemented using a Local Area Network (LAN). The stand-alone systems offer a more restrictive solution than do the LAN systems. Because of this, they can be considered a simpler sub-set of the LAN systems and will not be discussed further.

LAN technology is relatively inexpensive and provides shared access to the stored data. However, the LAN solution is a compromise between desired performance and cost. The performance goal is to provide as wide an audience as possible with access to the stored information in order to maximize benefits. LAN can only provide access over a restricted area: a single building or possibly a small group of buildings are the limits of the technology.

WAN technology allows companies to span larger geographic distances. This is typically done by providing point-to-point connections between offices, often over leased telephone lines. Even within the standardized environment of a single company, the cost is significant and the solution is inflexible. Expanding the network requires additional specialized equipment and support personnel for each site to be added. If multiple companies share a WAN, an additional layer of complexity and expense is added as network bridges, protocol converters, and format translators are added to connect incompatible computer systems.

The result of the network technology trade-offs is that existing document storage and retrieval systems are designed for use in a limited geographical area, served by a LAN. If remote access is needed, dial-in capability is provided via modems. This approach incurs long distance telephone charges and there is a risk that a remote user will not be able to obtain access if the fixed number of available modem ports is exceeded.

Because the systems are designed for limited geographic areas, they do not provide an on-line capability for interactive communication between the users. The assumption is that the users can meet in person to discuss the documents if the need arises. Where remote access is available via a dial-up port, and interactive discussion is needed, two phone lines may be required for each user: one for the modem connection; and one for the voice connection. A second phone line is not always available and where it is, its use results in doubling the long distance charges.

Documents to be inserted into these systems are typically processed by support staff who scan the documents and manually code the supporting information. This adds cost to the system and often creates a significant lag time between document submittal and availability on the system. Rather than around the clock access, documents can only be inserted when the support staff is available. This can be a significant restriction to a user who is working late or on a weekend and needs immediate access to a newly inserted document. Further difficulties are faced by remote users, in different time-zones where local work-days may not overlap with those of the support staff.

As businesses become increasingly global in nature, the existing document storage and retrieval systems are unable to meet the needs of their users in a cost effective and efficient manner. It is becoming commonplace for personnel from several different cities, or even countries, to be working on a single project. Joint ventures between companies are increasing as more diverse resources are required. This trend is evidenced by increased use of tele-conferencing, video-conferencing, and electronic mail to manage far flung projects.

Another result of the distributed nature of businesses is the recent explosive growth in utilization of the Internet. Businesses and individuals have become aware that a tele-communications infrastructure is in place which can be accessed around the globe.

Once the realm of only the computer literate, the Internet is adapting to provide services to everyday users. Applications and services are being developed to meet the needs of a more general population. Among these are electronic mail, bulletin board services (BBS), and information databases. Newer developments include an on-line "chat" capability providing interactive textual communication between users and the ability to transmit audio voice communication between users.

In order to attract users, the customer base of the Internet, on-line applications are becoming easier to use and more attractive. Icons and hyper-text provide point and click access to much of the net. Multi-media is rapidly moving to the forefront. User interfaces make extensive use of color, graphics (both as illustrations and as icons), video, and audio. In some ways, however, the displays are still limited. User screens are often static, having been pre-generated. Dynamic data, such as search results, are presented in simple lists rather than having new screens built to more effectively present the information.

The amount of data which must be transmitted over the network and processed in support of these applications has increased dramatically. This has led the Internet community to adopt data format standards which emphasize compact data, color representation, and motion capability. The GIF, JPEG, and MPEG standards, among others, have evolved to meet these needs. These vector-based representations have become the de facto standards for Internet development.

While common in electronic document handling systems, the Tagged Image File Format (TIFF) format is rarely used with Internet applications. Due to the bandwidth limitation of the Internet, and of the various methods of accessing the Internet, applications developed for that environment focus on minimizing the size of the data files transferred. As a raster format, TIFF files are typically larger than vector representation of the same data. Further, Internet applications use predominantly color interfaces and are rapidly adding motion capabilities. Neither of these capabilities is supported by the TIFF format. As a monochrome format, TIFF only supports a 2 level representation, typically interpreted as black and white. Neither gray-scale nor color representations are available. Attempts to provide document storage and retrieval systems using current Internet techniques have had limited success. The response times required to transmit and display a document for viewing are too long for user acceptance or for practical use.

A further problem with using vector formats for document imaging is that Optical Character Recognition (OCR) can not be accurately performed directly on the resulting files. This precludes the capability of converting a document to text for manipulation by text-based systems such as word processors. Image manipulations such as rotating the image, flipping the image, or magnifying the image are either not supported or take too long for user acceptance.

Although TIFF produces larger files which are incompatible with the needs of typical Internet applications, it is well suited to the present invention. Its raster format allows rapid display of back and white documents, allows manipulations such as rotating or flipping the image, zooming in (magnifying) on the image, and also supports OCR. OCR is critical to the invention as it allows sections of the document to be extracted as text. This allows the information to be manipulated by conventional word processing applications for purposes such as insertion into another document as quoted material.

The imaging evolution on the Internet has widened the technology gap between Internet applications and document repository applications. These two areas of development are diverging as the solutions available become more focused.

A third area of technology which contributes to the present invention is the use of facsimile (FAX) machines for data collection. This is a known technique for collecting survey responses. Questionnaires can be filled out using a combination of methods such as check boxes and written responses. The questionnaire is then sent via FAX to the requesting organization. Mark-sensing technology is used to detect which boxes were checked or which blocks were filled in. OCR is used to convert hand-written or typed responses to textual data. The converted data is then entered into the survey database.

In existing systems, the storage structure of the database must be set up prior to entry of the data. The systems can recognize a field, such as a survey number, within the converted data and use it to select from among the pre-existing storage locations. However, no capability exists for the converted information to command an alteration to the storage structure such as the creation of a new directory, table, or file.

The use of FAX for data collection has been complicated by protocols and data formats which have historically been different than those used by computer and network applications. Only recently have these begun to converge. One change has been the adoption of the TIFF-3 format for use by FAX machines.

SUMMARY OF THE INVENTION

The disclosed invention presents a system for storage and retrieval of electronic documents and a method of using this system. Using a client-server architecture, the system provides a central document repository and one or more remote access sites. The repository and the remote sites are interconnected via a general purpose data network which is also used for other purposes. The use of a shared, general purpose network, such as the Internet, provides world-wide access without the use of specialized WAN equipment or dedicated connections. Documents are stored in the system using a monochrome, raster format to represent them as images. Documents are transmitted from the repository to the remote access sites for display to the user.

In a further embodiment of the system, search capability is provided within the repository to locate documents by specifying keywords which are compared to data fields stored with the documents. The search results are transmitted to the remote access sites and displayed to the user by generating a screen containing text description and selectable elements such as hyper-text fields or graphic icons corresponding to the located documents. Clicking on the hyper-text link or icons initiates the transfer and display of the document image(s).

A further embodiment of the system provides for input of documents via facsimile (FAX) machines accessing the repository over a data link. A form containing instructions as to how the document is to be stored is input to a FAX machine along with the document. The information is transmitted to the repository over the data link. On receipt, the form is decoded by a combination of OCR and mark-sensing technology and converted into commands to the repository. Included in the commands are optional values to be placed in user searchable fields associated with the document. The document image is stored within the repository as indicated by the form in the data format generated by the FAX machine. This capability is in addition to more conventional methods such as scanning a document and uploading the resulting file or capturing data from an on-line form which is filled out by a user.

In a further embodiment of the system, the central document repository is partitioned into multiple logical, or virtual, repositories. Each such virtual repository is associated with its own set of documents, users, and access control.

A further embodiment of the invention provides the ability for users to interact with each other via text or voice communication. This interaction allows the free interchange of ideas as two or more users review the same document, or set of documents, even though the users are at diverse geographic locations.

A further embodiment of the invention provides the capability to store and index multimedia documents. Where conventional documents are composed of text and graphics, multimedia documents contain audio and/or video data in addition to text and graphics. In some cases, there will be no text content at all. Multimedia documents are stored in industry standard digital formats. The above search capability is also available for multimedia documents as is playback of the documents using commercially available software applications.

Further objects and advantages of the invention will become readily apparent in light of the following description of the preferred embodiment. The invention is capable of other and different embodiments and its several details are capable of modifications in various respects without departing from the invention. The drawings and description are intended to be illustrative in nature, and not restrictive.

DESCRIPTION OF THE PREFERRED EMBODIMENT

Figure 1:
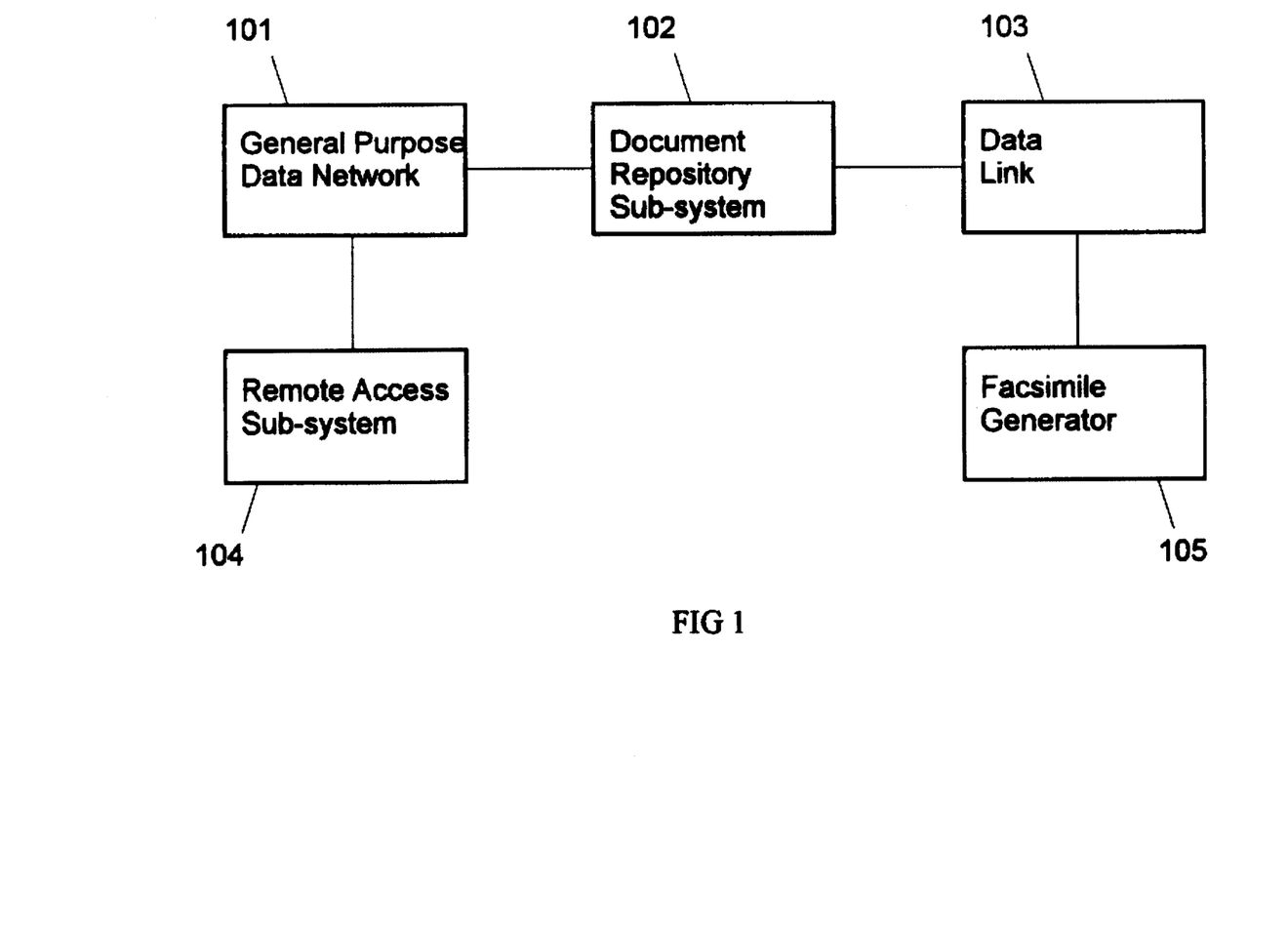
FIG. 1 is block diagram of the entire system showing the interrelationship of the sub-systems.

At present, the best mode of practicing the invention is to implement the system using the Internet as the General Purpose Data Network, 101, in the drawings. Internet is a well-known, easily accessible Wide Area Network (WAN). The Document Repository Sub-system, 102, comprises one or more physical computer systems connected to the Internet. The Remote Access Sub-systems, 104, are individual computer systems with either dedicated or dial-up connections to the Internet.

The details of the Document Repository Sub-system will be discussed with reference to FIG. 2, unless another Figure is specifically referenced. The Document Repository is logically segmented into multiple virtual repositories. Each virtual repository is specific to a user or set of users. Clearly, other security mechanisms are also applicable. This approach provides the users with the appearance of a dedicated, stand-alone repository while avoiding the costs of dedicated computer and communications hardware and support personnel. Each virtual repository supports multiple concurrent sessions with Remote Access Sub-systems. The number of sessions is unconstrained by a limited number of physical dial-in ports at the repository. Two levels of security are provided for the repository. The first prevents unauthorized access to the repository itself. The second controls access to a specific virtual repository.

The Document Repository Sub-System, 102, may be implemented on either a single computer system or may use multiple systems to achieve fault tolerance or speed optimization.

Documents are stored in the Document Image Store, 202, as sets of digital images. Each page of the document is a separate image. The images are formatted as two tone (black & white) raster data. The TIFF family of formats is currently being used as it provides the best results and is used by facsimile machines. This allows a faxed document to be transferred into the document image store with no further conversion.

In addition to the document images, Searchable Text, 201, is available to support user queries. The Searchable Text comprises a set of fields specified by the user at the creation of the database. The values to be stored in these fields for each document are specified by the user either when the document is entered or as a subsequent update. By restricting the search to specific fields, rather than always searching the full text of the document, the search executes significantly faster. The finite number of fields allows techniques from the database arts to be used to speed the search. Where desired, a field may be specified to hold the full, translated text of the document. This allows conventional full-text searching through the same search mechanism.

This search capability is implemented by the Database Query, 204, which is implemented by a generic database "search engine." Several such search engines are available as commercial software products. The Database Query also makes use of information from the Document Index, 203. The Document Index contains information about the storage structure, document names, insertion dates, originator names, and other overhead information required to maintain the Document Image Store.

Figure 4:
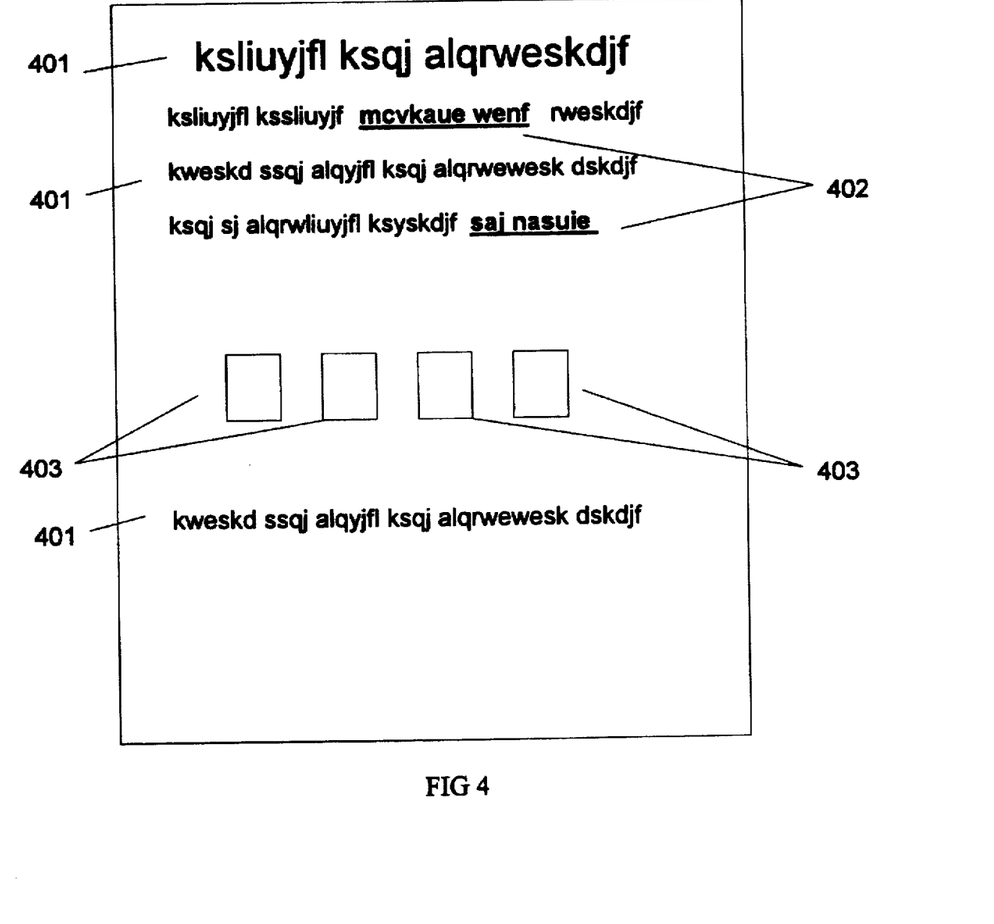
FIG. 4 shows a possible configuration for the query results screen. Elements 401 are descriptive text fields optionally containing embedded hyper-text fields. Elements 403 are optional graphical icons.

The results of a user query are routed from the Database Query, 204, to the Screen Generator, 207. The Screen Generator creates a user interface screen, see FIG. 4, which is tailored to the query results. This screen is transmitted to the requesting Remote Access Sub-system, 104 in FIG. 1, for presentation to the user. Graphic icons, 403, or hyper-text fields, 402, both in FIG. 4, are keyed to documents or document pages located by the query. This provides the user with point and click access to the results from a user friendly, more appealing interface.

The Screen Generator, 207, generates screens in hypertext mark-up language (HTML) which is the de facto standard for Internet user interfaces. A further advantage to this on-demand screen generation approach is that an alternate mark-up or description language can be implemented without requiring modification of the stored data.

The Network Interface, 206, provides a single point of access to the General Purpose Data Network, 101. It handles all Internet protocol issues as well as any hardware interface issues unique to the specific connection selected. The Network Interface also implements encryption of the documents as they are transmitted over the network. This provides protection from interception or loss of sensitive data.

The Remote Input, 205, accepts transmissions from a Facsimile Generator, 105 such as a conventional FAX machine, or a FAX interface cards for a computer. The Data Link, 103, may be conventional analog telephone lines, Integrated Services Digital Network (ISDN) lines, or any other functional equivalent. The received data comprises two parts, both encoded in TIFF format. The first part is control information which specifies where the data is to be stored and how it is to be accessed. Included in this information is a virtual repository identifier, user ID and password, file name, document name, and searchable text. This information is translated using a combination of OCR and mark-sensing techniques. The second part of the information is the image(s) of the document. This information is inserted in the Document Image Store, 202, as specified by the control information. Where translation occurs without error, the entire input process occurs without human intervention at the repository site.

Interactive communication is provided between two or more Remote Access Sub-systems, 104, FIG. 1. The initial connection is coordinated by the Connection Directory, 208, based on stored information about which users are reviewing which documents. The Connection Directory restricts communication to be between the users of a particular virtual repository and can further limit it to be between the reviewers of a specific document. Within this set, a user may choose to communicate with all other available users, a sub-set, or a single specified user. After the connection is established, the data is transmitted directly between the involved Remote Access Sub-systems. This communications capability allows users at physically separated locations, who are reviewing the same document or set of documents, to exchange ideas in much the same manner as physically co-located users, thereby increasing the effectiveness of their review.

The Interactive communication data may be either text and/or graphics data or audio voice. Extending this capability to include video transmission is anticipated. Text/graphics and voice capability are implemented by adapting Internet "chat-room" technology and the ability to transmit voice over the Internet to the specific needs of the document repository.

Figure 3:
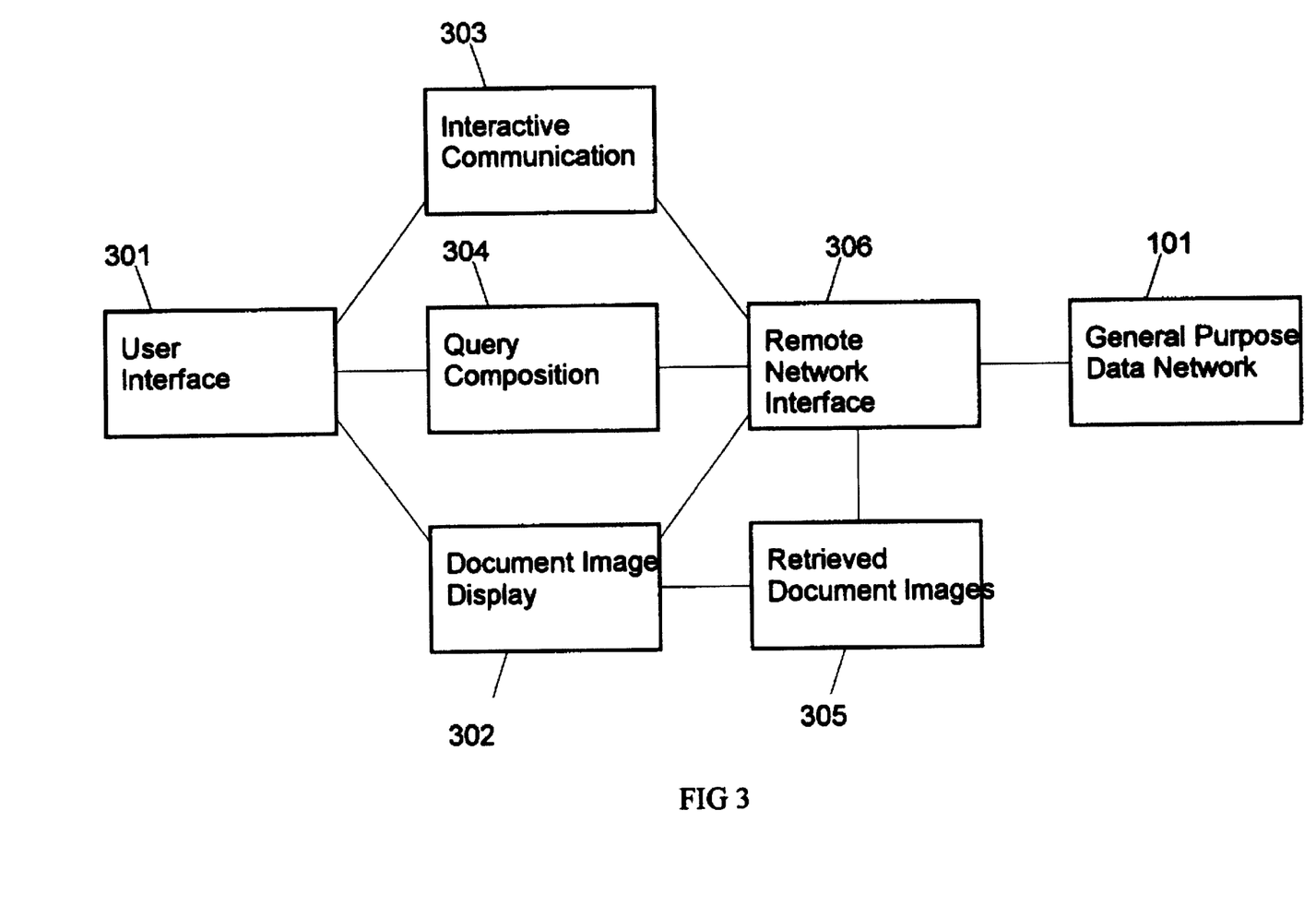
FIG. 3 is a block diagram of the remote access sub-system showing its major components.

The Remote Access Sub-system will be described with reference to FIG. 3. The User Interface component, 301, handles most of the user interaction with the system such as access control, screen display, and activation of the other components as they are needed. Query Composition, 304, accepts input from the user and formats it into a formal query. This query is then passed to the Remote Network Interface, 306, for transmission over the General Purpose Data Network, 101, to the Document Repository Sub-system, 102 in FIG. 1, where it is processed as described above. The screen containing the query results is returned to the Remote Access Sub-system and displayed by the User Interface.

Figure 2:
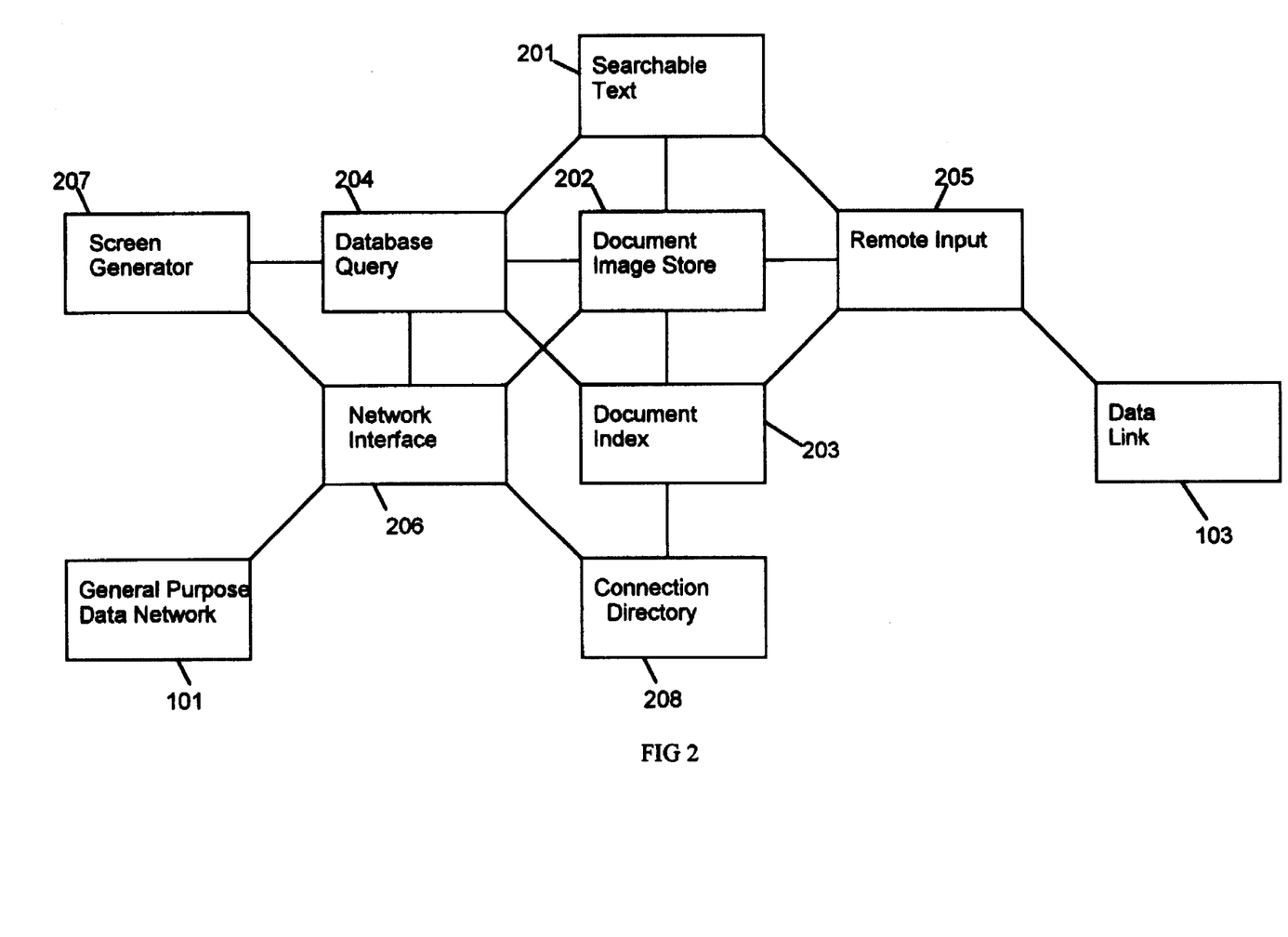
FIG. 2 is a block diagram of the document repository sub-system of the invention showing its major components and their interrelationships.

The Remote Network Interface, 306, performs a similar function to the Network Interface, 206 in FIG. 2, of the repository. It provides a single point of access to the General Purpose Data Network, 101, and handles all protocol issues and hardware interface issues required to establish and maintain network communications. The Remote Network Interface also implements decryption of the documents received from the repository.

Figure 5:
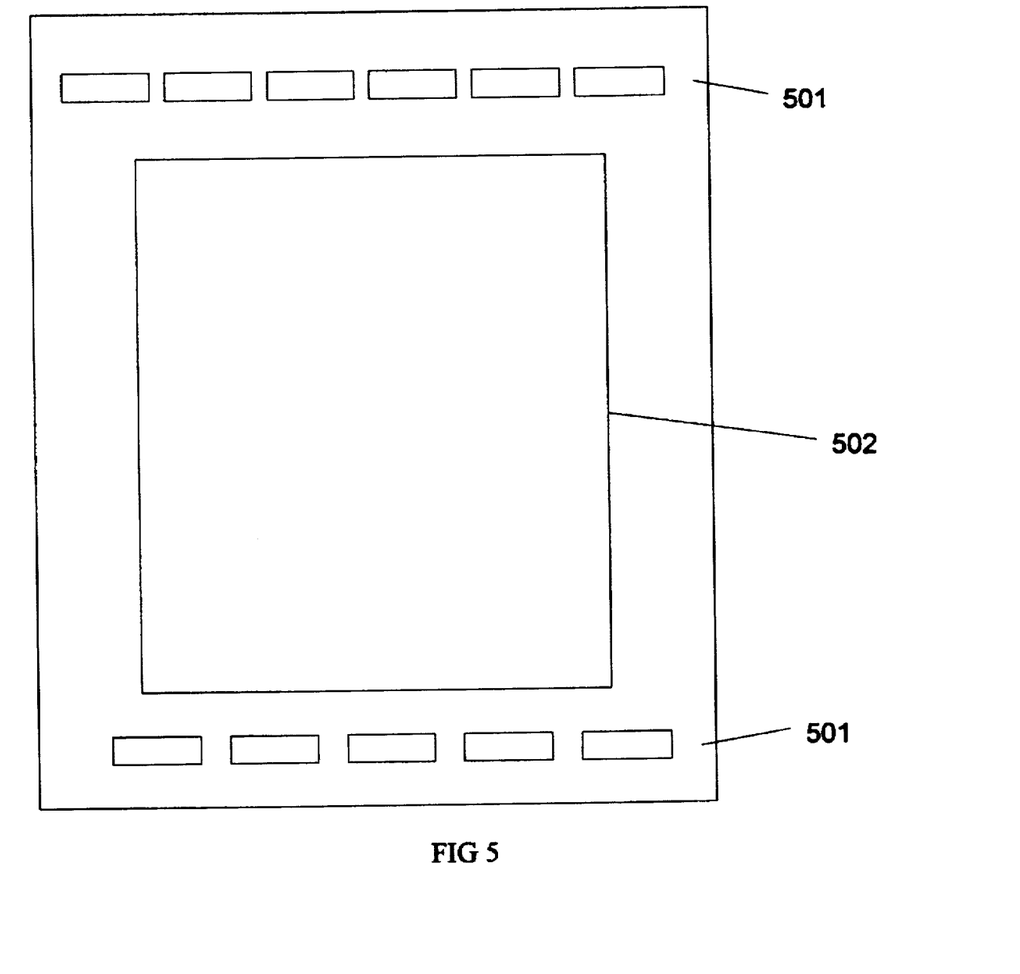
FIG. 5 shows a possible configuration of the user screen generated by the document image display tool. The area 502 contains the displayed image. Elements 501 are selectable user interface elements such as menus, buttons, and icons.

When the user selects specific items from the query results screen for display, a request is sent to the Document Repository Sub-system over the network. The corresponding document images are transmitted to the Remote Access Sub-system. Upon receipt, the Remote Network Interface, 306, temporarily stores the images as Retrieved Document Images, 305, and notifies the Document Image Display, 302, of their availability. The Document Image Display then generates a display screen similar to that shown in FIG. 5 to display the image to the user.

The Document Image Display, 302, presents the document image to the user and supports user manipulations of the image such as rotating or flipping the image and zooming in (magnifying) on the image. This allows the user to select the optimal presentation for the users purposes. The Document Image Display also supports OCR so that the image can be translated into text for use outside of the system.

The Interactive Communication component, 303, provides a means whereby two or more users of Remote Access Sub-systems can communicate while connected to the system. When requested by the user, the Interactive Communication component will contact the Connection Directory, 208 in FIG. 2, at the repository by sending a message through the Remote Network Interface and over the General Purpose Data Network. The Connection Directory will supply, by return message, those users connected to the repository and, optionally, those reviewing the same documents as the requester. After the user selects those other users with whom the user desires to communicate, the Interactive Communication component will then contact the corresponding Interactive Communication component resident on those users Remote Access Sub-system by sending messages over the General Purpose Data Network. Once the connection is established, the users continue to communicate by sending further messages over the network.

The above disclosure describes only the preferred form of the invention. As previously mentioned, alternative methods of practicing the invention will be readily apparent to the skilled practitioner. It is to be understood that the invention is capable of use in various other combinations and environments and is capable of changes or modifications within the scope of the inventive concept as expressed herein.

I claim:

1. An apparatus for storing and retrieving electronic documents, comprising:

(a) a document repository comprising a first programmable computer, a non-volatile storage device accessible by said programmable computer, a storage program executing on said first computer which stores said documents on, and retrieves said documents from said non-volatile storage device;

(b) a plurality of remote access systems, each comprising a second programmable computer and an access and display program executing on said second computer for displaying said documents to the user of said remote system;

(c) a general purpose, wide area data network connecting said first computer and said second computer, whereby said documents can be transferred from said storage program to said display program;

(d) means for remote data entry which accepts control and document data from plural facsimile machines connected to said first programmable computer by a data link, wherein said control information specifies where said document data is to be stored within said document repository;

(e) means for transmitting interactive communication between said users over said general purpose data network.

2. The document storage and retrieval apparatus of claim 1 wherein said interactive communication comprises transmission of visual material.

3. The document storage and retrieval apparatus of claim 1 wherein said interactive communications comprises transmission of audio material.

4. An apparatus for storing and retrieving electronic documents, comprising:

(a) a document repository comprising a first programmable computer, a non-volatile storage device accessible by said programmable computer, a storage program executing on said first computer which stores said documents on, and retrieves said documents from said non-volatile storage device;

(b) a plurality of remote access systems, each comprising a second programmable computer and an access and display program executing on said second computer for displaying said documents to the user of said remote system;

(c) a general purpose, wide area data network connecting said first computer and said second computer, whereby said documents can be transferred from said storage program to said display program;

(d) means for searching said stored electronic documents for documents which match criteria specified by said remote system user;

(e) means for on-demand generation of user interface screens containing plural user selectable elements linked to said documents located by said query, said screens displayed by said remote access systems;

(f) means for remote data entry which accepts control and document data from plural facsimile machines connected to said document repository by a data link, wherein said control information specifies where said document data is to be stored within said document repository;

(g) means for transmitting interactive communication between said users over said general purpose data network;

wherein said electronic documents are encoded in a monochrome, raster data format selected from the Tagged Image File Format (TIFF) family of formats.

5. The document storage and retrieval apparatus of claim 4 wherein said interactive communication comprises transmission of visual material.

6. The document storage and retrieval apparatus of claim 4 wherein said interactive communications comprises transmission of audio material.

7. An apparatus for storing and retrieving electronic documents, comprising:
- (a) a document repository comprising a first programmable computer, a non-volatile storage device accessible by said programmable computer, and a storage program executing on said first computer which stores said documents on and retrieves said documents from said non-volatile storage device;
- (b) a plurality of remote access systems, each comprising a second programmable computer and an access and display program executing on said second computer for displaying said documents to the user of said remote system;
- (c) a general purpose, wide area data network connecting said first computer and said second computer, whereby said documents can be transferred from said storage program to said display program;
- (d) means for searching said stored electronic documents for documents which match criteria specified by said remote system user;
- (e) means for on-demand generation of user interface screens containing plural user selectable graphic icons linked to said documents located by said means for searching, said screens displayed by said remote access systems;

wherein said electronic documents are encoded in a monochrome, raster data format.

8. The document storage and retrieval apparatus of claim 6 wherein said user selectable elements are text fields.

9. An apparatus for storing and retrieving electronic documents, comprising:
- (a) a document repository comprising a first programmable computer, a non-volatile storage device accessible by said programmable computer, and a storage program executing on said first computer which stores said documents on and retrieves said documents from said non-volatile storage device;
- (b) a plurality of remote access systems, each comprising a second programmable computer and an access and display program executing on said second computer for displaying said documents to the user of said remote system;
- (c) a general purpose, wide area data network connecting said first computer and said second computer, whereby said documents can be transferred from said storage program to said display program; and
- (d) means for remote data entry which accepts control and document data from plural facsimile machines connected to said first programmable computer by a data link; wherein said control information specifies where said document data is to be stored within said document repository, wherein said electronic documents are encoded in a monochrome, raster data format.

10. An apparatus for storing and retrieving electronic documents, comprising:
- (a) a document repository comprising a first programmable computer, a non-volatile storage device accessible by said programmable computer, and a storage program executing on said first computer which stores said documents on and retrieves said documents from said non-volatile storage device;
- (b) a plurality of remote access systems, each comprising a second programmable computer and an access and display program executing on said second computer for displaying said documents to the user of said remote system;
- (c) a general purpose, wide area data network connecting said first computer and said second computer, whereby said documents can be transferred from said storage program to said display program; and
- (d) means for transmitting interactive audio communication between said users over said general purpose data network;

wherein said electronic documents are encoded in a monochrome, raster data format.

11. An apparatus for storing and retrieving electronic documents, comprising:
- (a) a document repository comprising a first programmable computer, a non-volatile storage device accessible by said programmable computer, and a storage program executing on said first computer which stores said documents on and retrieves said documents from said non-volatile storage device, said document repository being segmented into plural virtual repositories;
- (b) a plurality of remote access systems, each comprising a second programmable computer and an access and display program executing on said second computer for displaying said documents to the user of said remote system;
- (c) a general purpose, wide area data network connecting said first computer and said second computer, whereby said documents can be transferred from said storage program to said display program;

wherein said electronic documents are encoded in a monochrome, raster data format.

* * * * *